United States Patent [19]

Aizawa

[11] 3,820,773
[45] June 28, 1974

[54] APPARATUS FOR FEEDING A WORKPIECE INTO CUTTING POSITION ON A CUTTING DEVICE

[75] Inventor: Tsuneo Aizawa, Isehara, Japan

[73] Assignee: Amada Company Limited, Kanagawa-ken, Japan

[22] Filed: Sept. 27, 1971

[21] Appl. No.: 183,953

[30] Foreign Application Priority Data
Sept. 30, 1970 Japan.............................. 45-85122

[52] U.S. Cl. ............... 269/32, 10/107 PH, 29/559, 83/418, 83/436, 269/212, 269/298
[51] Int. Cl............................................. B23q 3/08
[58] Field of Search......................... 269/27, 32–33, 269/30, 212, 298; 29/559; 83/436, 418; 10/107 PH

[56] References Cited
UNITED STATES PATENTS

| | | | |
|---|---|---|---|
| 850,865 | 4/1907 | Bright................................ | 269/32 |
| 941,543 | 11/1909 | Sistek et al. ......................... | 269/32 |
| 1,028,584 | 6/1912 | McKnight......................... | 269/212 X |
| 1,297,112 | 3/1919 | Dayton ............................. | 269/32 X |
| 1,393,766 | 10/1921 | DuCharme......................... | 269/171 |
| 2,260,611 | 10/1941 | DiSanto........................... | 10/107 PH |
| 2,289,140 | 7/1942 | Mohan.............................. | 269/32 X |
| 2,327,920 | 8/1943 | Moohl.............................. | 269/32 X |

Primary Examiner—Al Lawrence Smith
Assistant Examiner—J. T. Zatarga
Attorney, Agent, or Firm—Cecily L. Frey

[57] ABSTRACT

Apparatus for feeding a workpiece into cutting position on a cutting device, especially on a band-sawing device, wherein a work feed roller is raised above or lowered below the upper surface of the base of the cutting device by using hydraulic pressure for operating a hydraulic vice, thus relieving manual labor for feeding the workpiece, and enabling an extremely simplified feeding operation.

6 Claims, 4 Drawing Figures

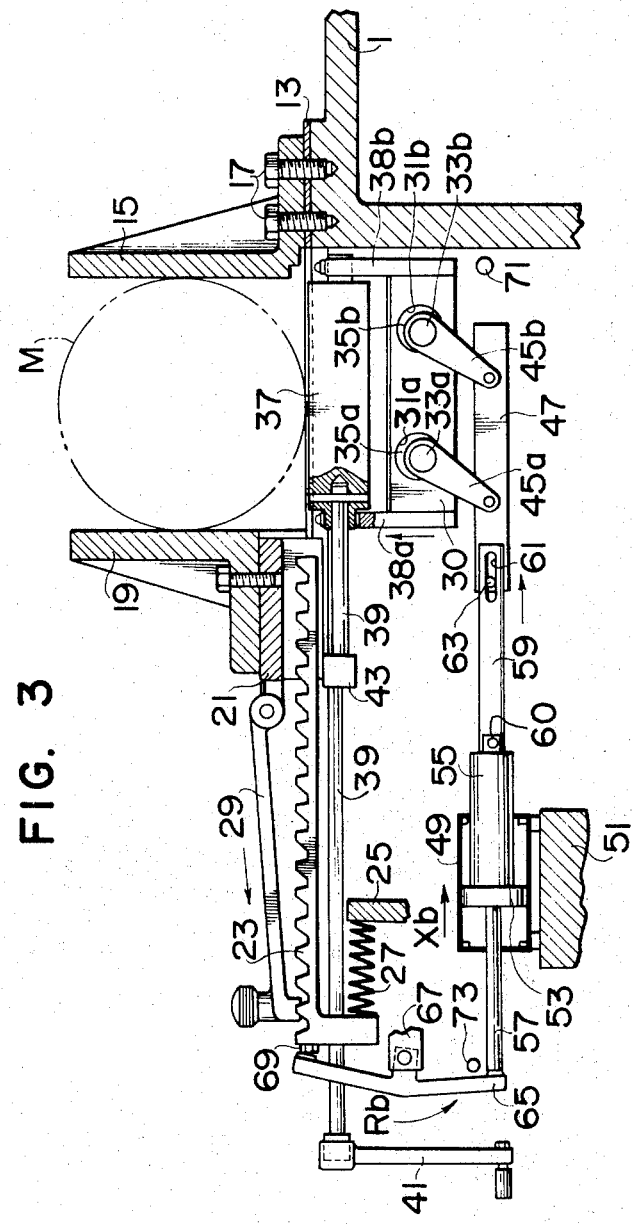

APPARATUS FOR FEEDING A WORKPIECE INTO CUTTING POSITION ON A CUTTING DEVICE

This invention relates in general to metal-machining devices and more particularly to an apparatus adapted for feeding a workpiece into cutting position on a metal-cutting device, especially a band-sawing device.

Heretofore when a workpiece held on the cutting device of this kind was to be fed into cutting position, it was usually necessary for the operator to go behind the cutting device and push the workpiece forward on the base by using a bar or similar tool each time a piece was cut off. This operation was necessarily highly troublesome and labor-consuming.

It is an object of the present invention to provide an apparatus for feeding a workpiece into cutting position on a cutting device, wherein a work feed roller is so provided between jaws of a vice unit as to be located in a substantially central portion of the horizontal length of the clamping surfaces of the vice, and said feed roller is raised above or lowered below the base surface of the cutting device by using hydraulic pressure for operating a hydraulic vice, thus relieving manual labor required for feeding the workpiece, and enabling an extremely simplified feeding operation.

Other objects and advantages of this invention will become more apparent from the following description when read in conjunction with the accompanying drawings, in which a preferred embodiment of the invention is illustrated, and in which FIG. 1 is an overall front view of the inventive cutting device in a preferred, exemplary embodiment;

FIG. 3 is a view similar to FIG. 2 but showing the work feed unit and the vice unit when the workpiece is in the lowered cutting position.

Figure 1:
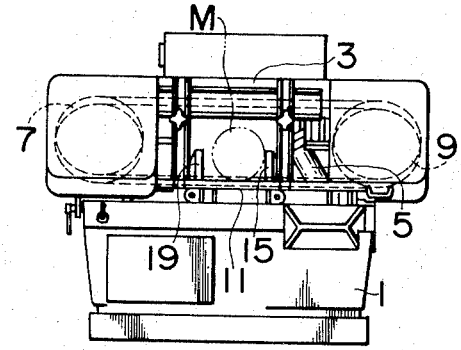

Referring to FIG. 1, numeral 1 denotes a base, 3 a housing pivotally mounted on the base, 5 a hydraulic cylinder for raising and lowering the housing, and 7, 9 a pair of saw wheels about which a band saw 11 is trained. Portions 25, 51 and 67 of base 1 will be referred to somewhat later.

Figure 2:
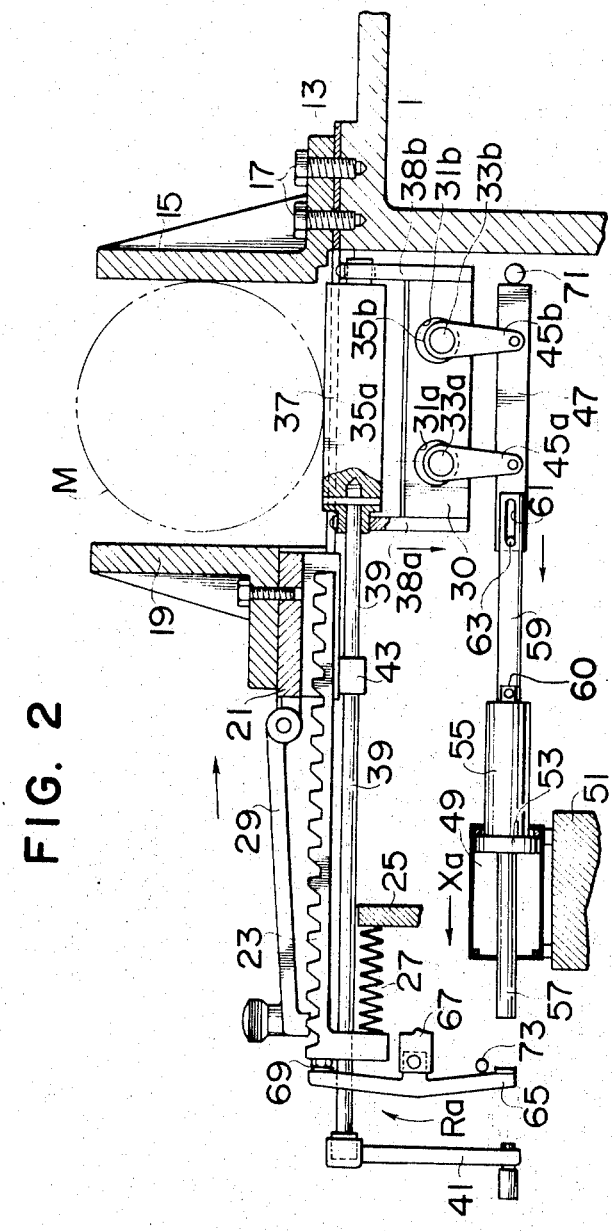
FIG. 2 is an enlarged front view, partly in section, of part of the cutting device of FIG. 1, showing, in a somewhat schematic manner, the work feed unit and the vice unit operatively associated therewith when the workpiece is in the elevated feed position.

Referring next to FIGS. 2 and 3, numeral 13 denotes a guide plate provided at the upper surface of the base 1. Numeral 15 denotes a fixed jaw of a vice unit secured to the right-hand side of the guide plate 13 by bolts 17, 19 a movable jaw slidably mounted on the left-hand side of the guide plate 13 in opposition to the fixed jaw 15 through an adjustment block 21, and 23 denotes a toothed rack slidably mounted on the upper surface of the base 1 and beneath said movable jaw 19 for sliding left and right as viewed in FIGS. 2 and 3.

The left-hand side extremity of the toothed rack 23 is bent downwards and carries one end of a compressed spring 27, the other end of which is supported by a portion 25 connected to the base 1 of the cutting device. 29 denotes an operating lever pivotally mounted to the left-hand part of the block 21 so as to extend laterally therefrom and engaging at its foremost part with one of the recesses on the toothed rack 23.

Numeral 30 denotes a support block provided beneath the guide plate 13 between fixed jaw 15 and movable jaw 19. Support block 30 is formed with a pair of bearing holes 31a, 31b towards its lower portion, for rotatably receiving a pair of eccentric cams 35a, 35b, respectively, which in turn have eccentric shafts 33a, 33b, supported for free rotation axially on both ends of the base 1, although the details have been omitted from the drawings for the sake of simplicity.

Numeral 37 denotes a workpiece feed roller carried rotatably by support plates 38a, 38b forming the upper extensions of the support block 30. The feed roller 37 is provided substantially under the center of the horizontal length of the clamping surfaces of the jaws 15, 19. Numeral 39 denotes a shaft fixed to and extending laterally from the left-hand end face of the feed roller 37, 41 a ratchet wrench for turning said shaft 39, 43 a universal joint, and 45a, 45b operating arms secured respectively to said shafts 33a, 33b in straight alignment with their shortest radii, and hingedly connected at their lower ends to an operating rod 47. The just described parts 39, 41 and 43 constitute means for manually feeding the workpiece by rotation of the feed roller 37.

Again as shown in FIGS. 2 and 3, numeral 49 denotes a double-acting cylinder secured to a portion 51 attached to the base 1, 53 a piston head slidably received in a bore of the cylinder 49 and having a first piston rod 55, of larger diameter, and a second piston rod 57, of lesser diameter, secured to and extended from the two end faces thereof. 59 denotes a link bar pivotally mounted at one end to the piston rod 55 by means of a pin 60, and having an elongated hole 61 at the other end for slidably receiving a member in the form of a pin 63 formed on the operating rod 47. It will be understood that elements 49 and 53 to 61 constitute a hydraulic unit, also shown in FIG. 4 with the exception of link bar 59 which extends from cylinder 49 at its end opposite to piston rod 57, and is mounted to the outer end of piston rod 55.

Numeral 65 denotes a see-saw lever pivotally mounted to a portion 67 on the base 1 with the upper part thereof engaging with a boss 69 provided to the left-hand end of the toothed rack 23 and the lower part thereof detachably engaging with the free end of the piston rod 57. 71 and 73 denote stop means fixedly mounted to the base 1, for the operating rod and see-saw lever 65, respectively.

The stop means 71 are so mounted that the operating rod 47 may be stopped when the eccentric cams 35a, 35b have been rotated counterclockwise past the uppermost change points where their longest radii assume vertical positions. Then the support block 30 and the feed roller 37 could not be lowered any more, even when the electric motor 83 is stopped driving the pump 81 to deliver the hydraulic fluid into the cylinder 49 and a heavy workpiece is mounted on the feed roller 37, since the cams are not rotated back, in the clockwise direction.

Figure 4:
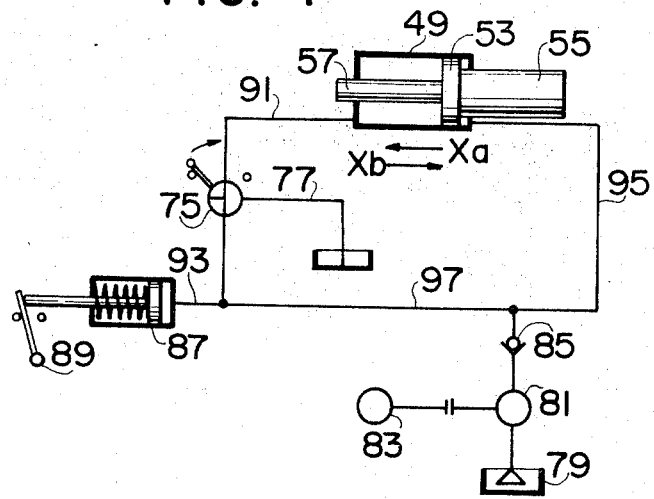
FIG. 4 is an explanatory view of an exemplary hydraulic driving and controlling circuit for the inventive mechanism.

Next, the hydraulic drive and control circuit for the present mechanism will be explained by referring to FIG. 4. Here 75 denotes a three-way valve, 77 a drain circuit, 79 an oil reservoir, 81 a hydraulic pump, 83 an electric motor, 85 a check valve, 87 a tappet cylinder, 89 a switch for the motor 83 actuatable from the tappet cylinder 87; and 91, 93, 95, 97 denote oil conduits. The electric circuit has been omitted for the sake of clarity.

In the foregoing exemplary construction of the present apparatus, the operation of clamping a workpiece M, following completion of the feed operation thereof, will now be explained. Referring to FIG. 4, when the three-way valve 75 is switched over, such as in a clockwise direction, the oil conduit 91 is hydraulically connected with the drain circuit 77, and hence the piston 53 is urged to move in a leftward direction, as illustrated, marked by an arrow Xa (FIG. 2), under the action of the remaining pressure oil in conduit 95.

As the hydraulic pressure in the oil conduit 95 is thus decreased, the piston of the tappet cylinder 87 is urged to move under the force of the enclosed spring, thus actuating the switch 89 and setting the electric motor 83 into operation. Upon actuation of the electric motor 83, the hydraulic pump 81 is set in operation for supplying pressure oil into oil conduit 95.

As the oil conduit 91 is connected hydraulically with the drain circuit 77, the oil pressure developed by the hydraulic pump 81 is fully exerted on the right-hand piston face, the piston head 53 being thus moved further to the left, in the direction marked by the arrow Xa, and towing the link bar 59 therewith, as shown in FIG. 2.

As the link bar 59 is displaced in this way towards the left in FIG. 2, eccentric cams 35a, 35b are set into rotation, the support block 30 being thus caused to descend.

As the support block 30 is caused to descend further and the feed roller 37 brought to a position lower than the level of the upper surface of the guide plate 13, the workpiece is placed on the latter, and the former is ready to be clamped by the vice unit.

As the link bar 59 is moved further leftwards, the piston rod 57 abuts on the lower end of the see-saw lever 65. Upon further movement of piston 53 and of rod 57 in the direction of the arrow Xa, the see-saw lever 65 is swung in the direction of an arrow Ra, in clockwise sense, the toothed rack 23 being thus displaced rightwards in FIG. 2, and the movable jaw 19 moves towards the fixed jaw 15 for clamping the workpiece therebetween.

As the movable jaw 19 is brought into clamping contact with the workpiece, the piston 53 is retarded from moving further, and the hydraulic pressure prevailing in the oil circuit 95 is now increased. Thus, the tappet cylinder 87 is actuated for breaking the switch 89, and the operation of the hydraulic pressure source 81 is interrupted. This operative phase is illustrated in FIG. 3.

When the clamp pressure of the movable jaw 19 should occasionally be decreased during the cutting operation, due to a decrease in the hydraulic pressure prevailing in the conduit 95, the tappet cylinder 87 is set in operation so as to re-establish automatically the pressure necessary for clamping the workpiece.

Next, the operation of releasing and feeding the workpiece M following the completion of one cycle of cutting operation will be explained. When the three-way valve 75 is switched over as shown in FIG. 4, namely to its counter-clockwise position, the oil conduit 97 is in hydraulic communication with the conduit 91 which has been opened to atmospheric pressure, resulting in reduced hydraulic pressure in the oil conduits 95, 97 and the energization of the electric motor 83 through the intermediary of the tappet cylinder 87.

When the electric motor 83 is thus energized and the hydraulic pump 81 actuated, pressure oil is supplied simultaneously to the right-hand side of the piston 53 through oil conduit 95 and to the left-hand side of the piston 53 through oil conduit 91. But, on account of the different effective zones on the two sides of the piston 53, the hydraulic pressure acting on the left-hand side face of the piston 53 overcomes that acting on the right-hand side thereof, thus causing displacement of the piston 53 towards the right-hand side, in the direction shown by an arrow Xb (FIG. 3).

When the piston head 53 is displaced in this way, see-saw lever 65 is disengaged from contact with the left-hand extremity of the piston rod 57. Thus, the toothed rack 23 is urged to move leftwards in FIG. 3 under the force of the compressed spring 27, and the movable jaw 19 can recede, away from the workpiece M, which is thus released from clamping pressure. As the piston head 53 is further moved in the direction of the arrow Xb and hence the toothed rack 23 moved further leftwards in FIG. 3, see-saw lever 65 is swung counter-clockwise, in the direction shown by an arrow Rb, and abuts on the stop means 73.

At this time, the left edge of the hole 61 abuts pin 63 of the operating rod 47 and, as the piston head 53 is further moved to the right, in the direction of the arrow Xb, the operating rod 47 is also displaced rightwards in FIG. 3, thus causing the eccentric cams 35a, 35b to turn in the counter-clockwise direction. Thus, the support block 30 is raised and the feed roller 37 emerges slightly from the upper surface of the guide plate 13. Simultaneously, the operating rod 47 abuts on the stop means 71.

With the piston head 53 in the halted position, the tappet cylinder 87 comes into operation due to increased hydraulic pressure, the same way as described before, and the electric motor 83 is de-energized. This operative phase is illustrated in FIG. 2. When the workpiece resting on the feed roller 37 is elevated to a position above the upper surface of the guide plate 13, ratchet wrench 41 is turned manually for rotation of the feed roller 37 axially and feeding the workpiece the required distance.

Thus, it will be apparent that the workpiece M can be easily fed on the feed roller 37 to the cutting position, and since the feed roller has been so designed as to be raised in a substantially central portion of the horizontal length of the clamping surfaces of the jaws 15, 19, i.e. in close proximity to the cutting position, even a very short workpiece can be fed.

Then the three-way valve 75 is switched over as described, and the feed roller 37 can then be lowered to a position beneath the upper surface of the guide plate 13 while the movable jaw 19 is brought to the work clamping position.

As described above, this invention enables the vice unit closure movement and the workpiece elevating movement to occur in an interrelated orderly sequence through using one and the same hydraulic system, so as to preclude the possibility that the workpiece should unexpectedly be elevated while clamped by the vice unit, or clamped while not in position on the guide plate.

The apparatus according to this invention is simple in construction, easy to operate, and can be manipulated with a high safety factor and with the least consumption of physical strength on the part of the operators. Moreover, despite the fact that the hydraulic power source is not used continuously but only on the necessary occasions, the workpiece can be elevated for feeding and clamping in a positive way. In addition, since the feed roller is mounted in the center of the vice unit and in close proximity to the cutting position on the cutting device, the length of material that can be fed can be reduced considerably; in other words, even a very short workpiece can be fed.

It should be understood, of course, that the foregoing disclosure relates only to a preferred, exemplary embodiment of the invention and that it is intended to cover all changes and modifications of the example described which do not constitute departures from the spirit and scope of the invention.

What I claim is:

1. An apparatus for feeding a workpiece into cutting position, comprising, in combination, a cutting device including a stationary and a movable jaw for clamping the workpiece therebetween and a block for supporting the workpiece, a cam mechanism including eccentric cams fixedly mounted on rotatable shafts, for movably supporting said block, an operating lever associated with said movable vice, a feed roller for the workpiece, supported by said block, operating arms for vertically reciprocating said feed roller, said arms being connected to an operating rod which in turn is connected to one side of a piston head of a hydraulic unit by the intermediary of a first piston rod therein, through a member which cooperates with said operating rod, so as to be slidable relative to the latter, and a second piston rod also in said hydraulic unit, for acting upon and reciprocating said operating lever, the latter being operatively linked to the other side of said piston head by way of a see-saw lever.

2. The apparatus as defined in claim 1, further comprising means for manually feeding the workpiece the required distance by rotating the feed roller.

3. The apparatus as defined in claim 1, further comprising a toothed rack mounted beneath said movable jaw for sliding movement in the axial direction of said feed roller, and means operatively linking said second piston rod to said toothed rack for actuating the latter, said see-saw lever also cooperating with said linking means.

4. The apparatus as defined in claim 1, wherein said cam mechanism operatively connects said block to said first piston rod by the intermediary of said operating arms, so as to accomplish the vertical reciprocation of said feed roller.

5. The apparatus as defined in claim 1, wherein said hydraulic unit further includes a cylinder accommodating said piston rods, said first piston rod having a larger diameter than said second piston rod, allowing displacement of said piston head toward said first piston rod when hydraulic pressure acts on both sides of said piston head.

6. The apparatus as defined in claim 5, wherein said hydraulic unit further includes a branch line and a tappet cylinder acted upon by the hydraulic pressure prevailing in said branch line, and means for increasing the hydraulic pressure upon actuation of said tappet cylinder.

* * * * *